(12) United States Patent
Johnson et al.

(10) Patent No.: US 12,411,693 B2
(45) Date of Patent: Sep. 9, 2025

(54) APPARATUS FOR PROCESSOR WITH HARDWARE FENCE AND ASSOCIATED METHODS

(71) Applicant: Silicon Laboratories Inc., Austin, TX (US)

(72) Inventors: Mark W. Johnson, Austin, TX (US); Eric Deal, Austin, TX (US); Junkang Ren, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/138,841

(22) Filed: Dec. 30, 2020

(65) Prior Publication Data
US 2022/0206799 A1 Jun. 30, 2022

(51) Int. Cl.
*G06F 9/38* (2018.01)

(52) U.S. Cl.
CPC .......... *G06F 9/3838* (2013.01); *G06F 9/3834* (2013.01)

(58) Field of Classification Search
CPC .............................. G06F 9/3838; G06F 9/3834
See application file for complete search history.

(56) References Cited

U.S. PATENT DOCUMENTS

| | | | |
|---|---|---|---|
| 5,781,753 A * | 7/1998 | McFarland | G06F 9/30003 712/209 |
| 6,061,785 A | 5/2000 | Chiarot | |
| 6,240,503 B1 * | 5/2001 | Witt | G06F 9/3836 712/23 |
| 6,240,508 B1 * | 5/2001 | Brown, III | G06F 9/383 710/39 |
| 8,972,704 B2 | 3/2015 | Kojo | |
| 2005/0223201 A1 | 10/2005 | Tremblay | |
| 2007/0143755 A1 | 6/2007 | Sahu | |
| 2010/0250802 A1 * | 9/2010 | Waugh | G06F 13/4022 711/155 |
| 2010/0318722 A1 | 12/2010 | Liu | |
| 2012/0167114 A1 * | 6/2012 | Morishita | G06F 9/3009 718/107 |
| 2012/0198214 A1 | 8/2012 | Gadre | |
| 2013/0205123 A1 * | 8/2013 | Vorbach | G06F 9/3836 712/221 |
| 2013/0282971 A1 | 10/2013 | Yang | |
| 2015/0095578 A1 | 4/2015 | Doshi | |
| 2017/0212764 A1 * | 7/2017 | Lyberis | G06F 9/30032 |
| 2017/0262285 A1 * | 9/2017 | Lukefahr | G06F 9/3836 |
| 2018/0365016 A1 * | 12/2018 | Iuliano | G06F 9/3834 |
| 2019/0004804 A1 * | 1/2019 | Hagiescu Miriste | G06F 9/3004 |
| 2022/0075746 A1 * | 3/2022 | Nalluri | G06F 13/1668 |

OTHER PUBLICATIONS

Ladan-Mozes et al., Location-Based Memory Fences, ACM SPAA'11, Jun. 4-6, 2011.

* cited by examiner

*Primary Examiner* — Courtney P Spann
(74) *Attorney, Agent, or Firm* — Law Offices of Maximilian R. Peterson

(57) ABSTRACT

An apparatus includes a pipelined processor. The pipelined processor includes a pipeline and a hardware fence. The hardware fence detects if a hazard condition exists by comparing an address for an input operation with an address for an output operation.

20 Claims, 11 Drawing Sheets

| Cycle 0 | Transaction | Read/Write | Address |
|---|---|---|---|
| Stage 0 | 0 | Write | 0 |
| Stage 1 | | | |
| Stage 2 | | | |

| Cycle 1 | Transaction | Read/Write | Address |
|---|---|---|---|
| Stage 0 | 1 | Write | 1 |
| Stage 1 | 0 | Write | 0 |
| Stage 2 | | | |

| Cycle 2 | Transaction | Read/Write | Address |
|---|---|---|---|
| Stage 0 | 2 | Write | 2 |
| Stage 1 | 1 | Write | 1 |
| Stage 2 | 0 | Write | 0 |

| Cycle 3 | Transaction | Read/Write | Address |
|---|---|---|---|
| Stage 0 | 3 | NoOp | |
| Stage 1 | 2 | Write | 2 |
| Stage 2 | 1 | Write | 1 |

| Cycle 4 | Transaction | Read/Write | Address |
|---|---|---|---|
| Stage 0 | 4 | NoOp | |
| Stage 1 | 3 | NoOp | |
| Stage 2 | 2 | Write | 2 |

| Cycle 5 | Transaction | Read/Write | Address |
|---|---|---|---|
| Stage 0 | 5 | NoOp | |
| Stage 1 | 4 | NoOp | |
| Stage 2 | 3 | NoOp | |

Fig. 1

| Cycle 0 | Transaction | Read/Write | Address | Fence |
|---|---|---|---|---|
| Stage 0 | 0 | Write | 0 | No |
| Stage 1 | | | | |
| Stage 2 | | | | No |

| Cycle 1 | Transaction | Read/Write | Address | Fence |
|---|---|---|---|---|
| Stage 0 | 1 | Read | 0 | Yes |
| Stage 1 | 0 | Write | 0 | No |
| Stage 2 | | | | |

| Cycle 2 | Transaction | Read/Write | Address | Fence |
|---|---|---|---|---|
| Stage 0 | 1 | Read | 0 | No |
| Stage 1 | | | | Yes |
| Stage 2 | 0 | Write | 0 | |

| Cycle 3 | Transaction | Read/Write | Address | Fence |
|---|---|---|---|---|
| Stage 0 | 1 | Read | 0 | No |
| Stage 1 | | | | No |
| Stage 2 | | | | |

| Cycle 4 | Transaction | Read/Write | Address | Fence |
|---|---|---|---|---|
| Stage 0 | 2 | NoOp | 0 | No |
| Stage 1 | 1 | Read | 0 | No |
| Stage 2 | | | | |

| Cycle 5 | Transaction | Read/Write | Address | Fence |
|---|---|---|---|---|
| Stage 0 | 3 | NoOp | 0 | No |
| Stage 1 | 2 | NoOp | 0 | No |
| Stage 2 | 1 | Read | 0 | |

Fig. 2

| Cache |   |
|---|---|
|   |   |

| Cache |   |
|---|---|
| 0 |   |

| Cache |   |
|---|---|
| 0 |   |

| Cache |   |
|---|---|
|   |   |

| Cache |   |
|---|---|
| 1 |   |

| Cache |   |
|---|---|
| 1 |   |

| Cycle 0 | Transaction | Read/Write | Address |
|---|---|---|---|
| Stage 0 | 0 | Read | 0 |
| Stage 1 |   |   |   |
| Stage 2 |   |   |   |

| Cycle 1 | Transaction | Read/Write | Address |
|---|---|---|---|
| Stage 0 | 1 | Write | 2 |
| Stage 1 | 0 | Read | 0 |
| Stage 2 |   |   |   |

| Cycle 2 | Transaction | Read/Write | Address |
|---|---|---|---|
| Stage 0 | 2 | Read | 1 |
| Stage 1 | 1 | Read | 0 |
| Stage 2 | 0 | Write | 2 |

| Cycle 3 | Transaction | Read/Write | Address |
|---|---|---|---|
| Stage 0 | 3 | Read | 1 |
| Stage 1 | 2 | Read | 0 |
| Stage 2 | 1 | Write | 2 |

| Cycle 4 | Transaction | Read/Write | Address |
|---|---|---|---|
| Stage 0 | 4 | Read | 1 |
| Stage 1 | 3 | Read | 1 |
| Stage 2 | 2 | Read | 0 |

| Cycle 5 | Transaction | Read/Write | Address |
|---|---|---|---|
| Stage 0 | 5 | Read | 1 |
| Stage 1 | 4 | Read | 1 |
| Stage 2 | 3 | Read | 1 |

Fig. 3

| Cycle 0 | Transaction | Read/Write | Address | Fence? | Cache Fence? |
|---|---|---|---|---|---|
| Stage 0 | 2 | Write | 0 | No | No |
| Stage 1 | 1 | Read | 0 | No | |
| Stage 2 | 0 | Read | 0 | | |

| Cache |
|---|
| 0 |

| Cycle 1 | Transaction | Read/Write | Address | Fence? | Cache Fence? |
|---|---|---|---|---|---|
| Stage 0 | 3 | Read | 0 | Yes | Yes |
| Stage 1 | 2 | Write | 0 | No | |
| Stage 2 | 1 | Read | 0 | | |

| Cache |
|---|
|  |

| Cycle 2 | Transaction | Read/Write | Address | Fence? | Cache Fence? |
|---|---|---|---|---|---|
| Stage 0 | 3 | Read | 0 | No | No |
| Stage 1 | | | | Yes | |
| Stage 2 | 2 | Write | 0 | | |

| Cache |
|---|
|  |

| Cycle 3 | Transaction | Read/Write | Address | Fence? | Cache Fence? |
|---|---|---|---|---|---|
| Stage 0 | 3 | Read | 0 | No | No |
| Stage 1 | | | | No | |
| Stage 2 | | | | | |

| Cache |
|---|
|  |

| Cycle 4 | Transaction | Read/Write | Address | Fence? | Cache Fence? |
|---|---|---|---|---|---|
| Stage 0 | 4 | Read | 0 | No | No |
| Stage 1 | 3 | Read | 0 | No | |
| Stage 2 | | | | | |

| Cache |
|---|
| 0 |

| Cycle 5 | Transaction | Read/Write | Address | Fence? | Cache Fence? |
|---|---|---|---|---|---|
| Stage 0 | 5 | Read | 0 | No | No |
| Stage 1 | 4 | Read | 0 | No | |
| Stage 2 | 3 | Read | 0 | | |

| Cache |
|---|
| 0 |

Fig. 4

Cycle 0 (100)

| Stage | Transaction | Read/Write | Address | Transaction | Read/Write | Address |
|---|---|---|---|---|---|---|
| Stage 0 | 2 | Read | 0 | 3 | Read | 1 |
| Stage 1 |   |   |   |   |   |   |
| Stage 2 | 0 | Write | 2 | 1 | Write | 0 |

Cycle 1

| Stage | Transaction | Read/Write | Address | Transaction | Read/Write | Address |
|---|---|---|---|---|---|---|
| Stage 0 | 2 | Read | 0 | 3 | Read | 1 |
| Stage 1 |   |   |   |   |   |   |
| Stage 2 | 1 | Write | 0 |   |   |   |

Cycle 2

| Stage | Transaction | Read/Write | Address | Transaction | Read/Write | Address |
|---|---|---|---|---|---|---|
| Stage 0 | 2 | Read | 0 | 3 | Read | 1 |
| Stage 1 |   |   |   |   |   |   |
| Stage 2 |   |   |   |   |   |   |

Cycle 3

| Stage | Transaction | Read/Write | Address | Transaction | Read/Write | Address |
|---|---|---|---|---|---|---|
| Stage 0 | 3 | Read | 1 | 4 | NoOp |   |
| Stage 1 | 2 | Read | 0 |   |   |   |
| Stage 2 |   |   |   |   |   |   |

Cycle 4

| Stage | Transaction | Read/Write | Address | Transaction | Read/Write | Address |
|---|---|---|---|---|---|---|
| Stage 0 | 4 | NoOp | 1 | 5 | NoOp |   |
| Stage 1 | 3 | Read | 0 |   |   |   |
| Stage 2 | 2 | Read |   |   |   |   |

Cycle 5

| Stage | Transaction | Read/Write | Address | Transaction | Read/Write | Address |
|---|---|---|---|---|---|---|
| Stage 0 | 5 | NoOp |   | 6 | NoOp |   |
| Stage 1 | 4 | NoOp | 1 |   |   |   |
| Stage 2 | 3 | Read |   |   |   |   |

Fig. 5

APPARATUS FOR PROCESSOR WITH HARDWARE FENCE AND ASSOCIATED METHODS

TECHNICAL FIELD

The disclosure relates generally to computing or processing apparatus and, more particularly, to apparatus for processors with hardware fence, and associated methods.

BACKGROUND

Advances in information processing has resulted in increasing demands for processing power. Examples include faster and larger memory, faster graphics or video hardware, and faster and more capable processors.

With advances in technology, an increasing number of circuit elements have been integrated into devices, such as integrated circuits (ICs). Furthermore, a growing number of devices, such as ICs, or subsystems, have been integrated into products. With developments such as the Internet of Things (IoT), this trend is expected to continue.

The growing number of circuit elements, devices, subsystems, etc., has also resulted in a corresponding increase in the amount of processing power used to provide the functionality of products employing such technology. Processors providing the processing power sometimes employ techniques to facilitate processing, such as pipeline processing.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes a pipelined processor. The pipelined processor includes a pipeline and a hardware fence. The hardware fence detects if a hazard condition exists by comparing an address for an input operation with an address for an output operation.

According to another exemplary embodiment, an apparatus an apparatus includes a pipelined processor. The pipelined processor includes a pipeline and a hardware fence. The pipeline processes instructions provided to the pipelined processor. The hardware fence detects if a hazard condition exists. The hardware fence includes a comparator to compare an address for a read operation with an address for write operation.

According to another exemplary embodiment, a method of processing information in a pipelined processor is provided. The method includes using a hardware fence to detect if a hazard condition exists by comparing an address for an input operation with an address for an output operation.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

FIG. 1 shows a diagram of transaction processing through a pipeline.

FIG. 2 shows a diagram of transaction processing through a pipeline with a hazard condition.

FIG. 3 shows a diagram of transaction processing through a pipeline employing a cache.

FIG. 4 shows a diagram of transaction processing through a pipeline employing a cache with a hardware fence.

FIG. 5 shows a diagram of transaction processing through a pipeline employing a first-in first-out (FIFO) element.

DETAILED DESCRIPTION

Figure 6:
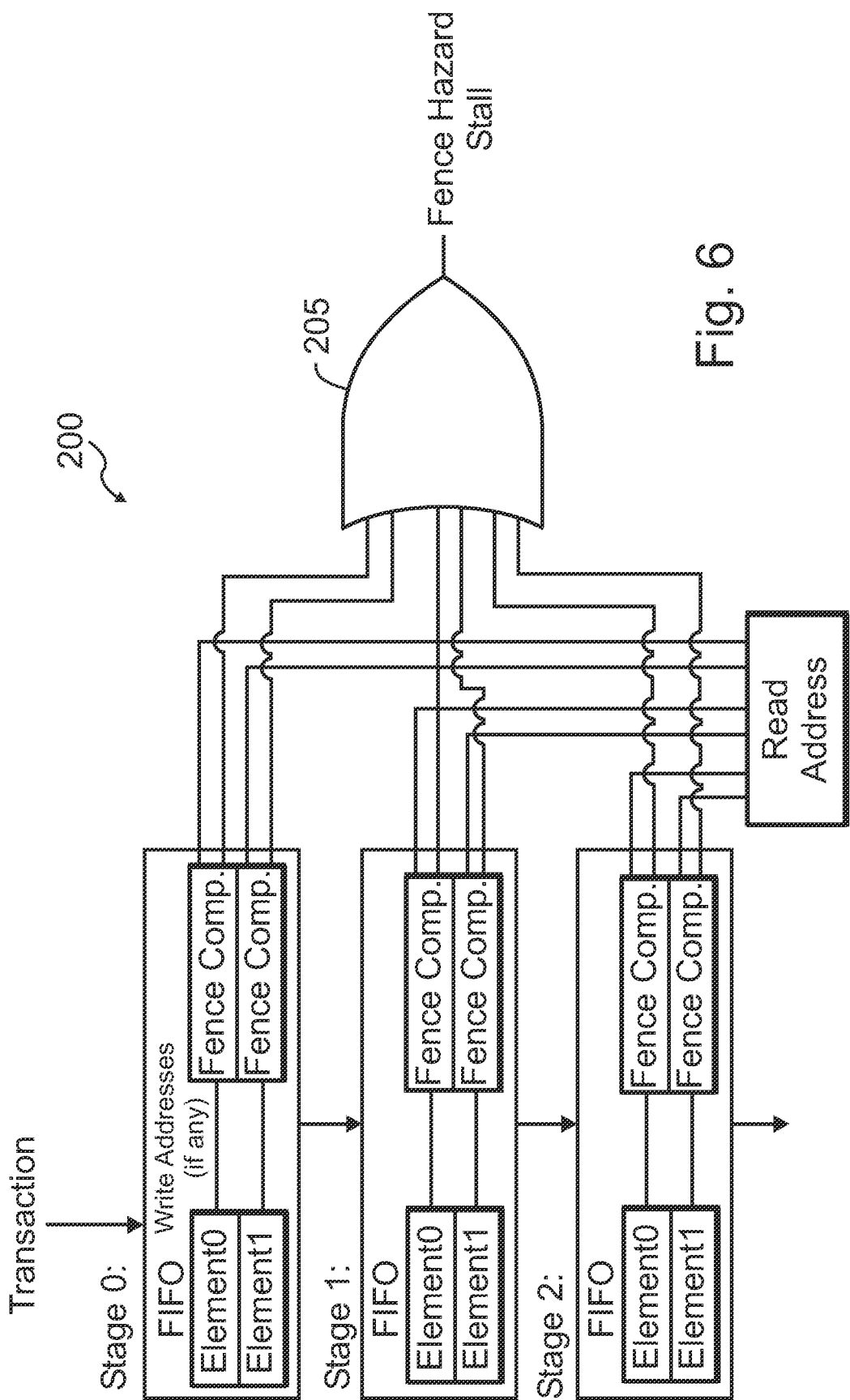
FIG. 6 shows a circuit arrangement for a hardware fence.

The disclosed concepts relate generally to computing or processing apparatus and, more particularly, to apparatus for pipeline processors with hardware fence, and associated methods. In some embodiments, pipeline processors also include a cache, a FIFO, or both.

Pipelining is well known in the art, and constitutes a scheme to improve the throughput of a processor or central processing unit (CPU) by using the processor's resources in a relatively efficient manner. Compared to non-pipelined processors, pipelined processors can therefore have higher processing throughput.

A typical processor may include various units or blocks of circuitry. They include a fetch unit that reads instructions from a memory, a decode unit that decodes the instructions so that they may be executed, an execution unit that executes the decoded instructions, and a write or store unit that writes the results of the executed instructions, for example, to one or more registers or back to a memory, such as the memory that contains the original instructions.

Typically, the instructions issued by a user (e.g., through a compiled software program) are split into a series of small independent stages. The stages perform various parts of the instruction. If the processor does not employ pipelining, some units may become idle. More specifically, if a unit is processing a particular instruction or part of instructions, the remaining units are idle.

This phenomenon leads to relatively inefficient use of the processor's resources. For example, when the decode unit is decoding a given instruction, the remaining units (fetch, execution, store) are not utilized. As such, the operations in the processor occur in a serial fashion, with one unit waiting for the previous unit to finish its task.

In contrast, in a pipelined processor the various units in the processor can work in parallel. As an example, when one instruction is being decoded by the decode unit, a second instruction may be fetched from memory, etc. Thus, compared to the non-pipelined case, processing of the instruction takes fewer clock cycles, and is therefore more efficient.

Pipelined processing operates by breaking an instructions or task into smaller chunks or transactions, and spreads them out over several time intervals. Ideally, the pipeline is fed with the smaller chunks each clock cycle so that on average an operation effectively only delays the overall operation or instruction by one pipeline stage or, put another way, a single cycle of the clock signal applied to the processor.

Such ideal conditions cannot always be met. An example that causes deviation from the ideal condition is where there are dependencies between the instructions in-flight or proceeding or progressing within the pipe. In an ideal situation, the instructions are fed to the pipeline in a stream, and are executed during designated clock cycles.

In some cases, situations called hazards can occur. The processor can stall on different events, including cache misses and hazards. A cache miss stalls the instructions on pipeline because a value associated with a particular instruction in the pipeline is not stored in the cache memory.

Hazards can also cause a stall condition in the pipeline, which leads to stalling the pipeline. Hazards prevent the next instruction in the instruction stream from being executed during the clock cycle that is designated for the execution of that instruction, giving rise to a delay. The delay causes a reduction in the throughput that the processor would ideally gain due to pipelining.

As persons of ordinary skill in the art understand, several types of hazard exist. One type of hazard occurs when properly executing an operation depends on the results of an operation that has not completed. This condition leads to a pipeline stall.

When the pipeline stalls, the dependent instruction is held off until the dependency has been resolved or met (e.g., the instruction whose results the dependent instruction wishes to use has completed execution) Eliminating a hazard often entails allowing some instructions in the pipeline to proceed while others are delayed. When an instruction is delayed during the stall, the instructions issued later than the delayed instruction are also delayed. Instructions issued earlier than the stalled instruction would continue, since otherwise the hazard would not clear.

Conventionally, software barriers have been used to address stalls because of hazards. For example, a compiler can detect such hazards statically, and insert barrier instructions. This approach entails using a compile (with this capability), and typically reduces efficiency, as it might typically force a full flush of the processing pipeline when a hazard is detected. In relatively deep pipelines, such a strategy would be relatively difficult to implement, and would increase the complexity of software (e.g., a driver) and verification.

Processors according to exemplary embodiments use a hardware fence or barrier (the terms "hardware fence" and "hardware barrier" are used interchangeably). The hardware barrier dynamically detects the type of hazard described above, and stalls the pipeline until the hazard has passed or resolved.

The hardware barrier in exemplary embodiments is implemented by inspecting memory elements in pipeline stages. The memory elements (either block memory or registers) hold the address of the output register ahead of the input stage. As a result of the inspection, the input stage(s) of the pipeline are stalled whenever in-flight write data is found ahead of the input read with the same address.

Put another way, a hardware barrier in exemplary embodiments inspects addresses of memory elements in the pipeline to determine whether a hazard exists. If so, the hardware barrier stalls an incoming instruction in the pipeline until the hazard is removed (or resolved or passes or clears).

As an example, suppose that a later read operation seeks to read the results of an earlier write operation that has not concluded. By inspecting the addresses specified in the read and write operations, the hardware barrier would detect that a hazard exists. In other words, given the identical addresses for the two operations, the read operation might provide erroneous results unless the write operation concludes before the read operation proceeds.

Because of the hazard, the read operation in the pipeline is stalled. The write operation, however, is allowed to proceed (otherwise the hazard would continue to exist indefinitely). Once the write operation concludes, the results of the operation are available. In other words, the hazard is removed. At that point, the read operation is allowed to proceed, i.e., the stall is resolved or cleared.

FIGS. 1-5 illustrate processing of transactions through a pipeline and the use of a hardware barrier to protect against hazards. FIG. 1 shows a diagram of transaction processing through a pipeline. More specifically, the figure illustrates a three-stage pipeline (Stages 0-2) as transactions flow through it.

Each box represents a new time via a clock cycle number. Thus, the figure shows clock cycles 0 through 5. In other words, each table in the figure corresponds to a clock cycle, e.g., cycle 0, cycle 1, etc. Other figures build on the example shown in FIG. 1.

Referring again to FIG. 1, the rows in the tables show the operations in each stage of the pipeline, i.e., stages 0-2. The Transaction column shows various transactions proceeding through the pipeline (e.g., transaction 0, transaction 1, etc.). The Read/Write column indicates whether the operation is a read operation or a write operation.

The Address column shows the address corresponding to the operation indicated in the Read/Write column. For example, in the top table, at Stage 0, Transaction 0 involves a write operation to address 0 in the memory, register, FIFO, etc.

In general, the assumption is that read operations occur from the transition of stage 0 to stage 1, and writes occur at the end of the pipeline. FIG. 1 illustrates 3 write operations (causing no fence hazard), followed by 3 no-operation instructions or operations (noops).

FIG. 2 shows a diagram of transaction processing through a pipeline with a hazard condition. Here, the Fence column indicates whether the hardware fence is activated because of a hazard. The figure illustrates a write-read fence hazard. A write operation has entered the pipeline (Cycle 0, Stage 0), followed by a read operation (Cycle 1, State 0).

Because both the read and the write operation use address 0, the read operation cannot proceed to Stage 1 until the results of the write operation have posted. In other words, a hazard exists, and the hardware fence or barrier stalls the pipeline (as indicated in Stage 1 of Cycle 1). Once the results of the write operation post, the read can proceed, as address 0 will contain the correct value.

The empty boxes are stalls, where no instruction is in the pipeline. Stages 1 and 2 use comparators used to implement the hardware fence by comparing the addresses specified for the read operation and for the write operation. If a write is detected in either stage at the address (0) that matches a stage 0 read operation, the hardware fence stalls the read operation at stage 0. Once the write operation concludes, the hazard passes, the hardware fence goes inactive, and Transaction 1 (read from address 0) is allowed to proceed.

In some embodiments, the pipeline may employ a cache memory (cache) for obtaining data in read operations. FIG. 3 shows a diagram of transaction processing through such a pipeline. More specifically, the cache is used to avoid duplicate bus reads in Stage 0.

The figure shows the cached value once a read operation has occurred. A read operation of a new address replaces the cached value with the new read data (box is cleared when this situation occurs, and will take the new value on the next clock cycle). Transactions 2, 4, and 5 can be filled by using the cache instead of by fetching from external memory. Note, that the cache can stay active if a write operation occurs that does not conflict with the cached value.

FIG. 4 shows a diagram of transaction processing through a pipeline employing a cache with a hardware fence. This technique can be used to reduce the chip area and power consumption used to implement a full fence.

Referring to FIG. 4, a write operation is entering the pipeline that will cause a hazard (at Cycle 2, Stage 0, where the read operation seeks to read from address 0, the same address used in the write operation at Stage 1). The cache hardware fence address comparator at Stage 1 is used to invalidate the cache if any write instruction enters the pipeline on a cached address.

The cache does not have to inspect every downstream element when caching an element, as the hardware fence will flush the pipeline clear of hazards. In other words, a partial fence may be used with the cache, as desired. Consider the following scenarios:
1. The instruction entering the pipeline is a write operation or a noop:
   a. This scenario is moot for the cache, as it is not used for these operations
2. The read address entering the pipeline does not match the cached value (or the cache is invalid):
   a. The primary hardware fence will stall the pipe if the read address matches an in-flight write address
   b. Therefore, the address will not be cached until the hazard is removed
   c. And no additional fencing need be used for the cache
3. The read address entering the pipe does match the cached address
   a. That the cache is valid means there were no hazards previously
   b. No new hazard is being introduced
   c. Accordingly, no hazard exists FIG. 5 shows a diagram of transaction processing through a pipeline employing a first-in first-out (FIFO) element. More specifically, the figure illustrates an application of the hardware fence to FIFO-based stages in the pipeline. Note that Transaction, Read/Write, and Address are shown for the FIFO Head, and also for the FIFO Tail (a 2-entry FIFO).

FIFO-based stages allow the pipeline to progress where it can. For example, Stage 2 at Cycle 0 has a write operation to address 2 (Transaction 0) and a read operation at address 0 (Transaction 2) at the head of the FIFO, but has also Transaction 1 (write operation to address 0, labeled as 100) in the 2-entry FIFO. This situation gives rise to a hazard, and might have occurred, for example, if the write path was stalled (e.g., on a shared bus). Under such circumstances each FIFO element being used is inspected by the hardware fence comparators. Conceptually, a FIFO is variable length collection of pipeline stages used for storage. At a given instance, the FIFO with n valid elements, can be conceptually considered as pipeline segment of n elements, and the valid elements inspected as the static stages of the overall pipeline. For example, if an 8-entry FIFO is used, it might run 1-entry full, therefore the 1 valid element is considered by the fence. If a hazard occurs downstream, the FIFO might fill up completely, then run with all 8 elements valid, and the hardware fence would then inspect all 8 valid elements of the FIFO.

FIG. 6 shows a circuit arrangement 200 for a hardware fence used with a FIFO-based pipeline. The FIFO-based pipeline has stages 0-2. The FIFO in each stage includes two elements (element( ) and element1). The transaction or operation is applied to Stage 0, the output of which drives Stage 1, and the output of Stage 1 drives Stage 2. The FIFO in each stage provides write addresses (if any) to the corresponding hardware fence comparators (denoted as a "fencecomp" block for each corresponding FIFO block).

The read address is provided to the hardware fence comparators in the three pipeline stages. As persons of ordinary skill in the art will understand, pipelines and FIFO with different numbers of stages, elements, depth, etc. may be used, as desired. In such situations, the numbers of hardware fence comparators would match the number of pipeline stages, etc.

The hardware fence comparators compare the write address and the read address for the corresponding FIFO elements. For example, the hardware fence comparator for element( ) of the FIFO in Stage 0 compares the read address with the write address provided by the FIFO element( ). If the addresses match, then a hazard exists.

The output of the hardware fence comparators from the pipeline stages feed corresponding inputs of OR gate 205. In the example shown, OR gate 205 has six inputs. If one or more inputs of the OR gate have a binary 1 value, the output of the OR gate indicates a hardware fence hazard stall. The output of the OR gate is used to determine whether a hazard exists and whether to stall the pipeline. Note that in some embodiments, some of the memory elements are FIFOs, where the comparison is built directly into the FIFO element, as every memory element is to be inspected.

In exemplary embodiments, the processing pipeline is not strict, allowing forks, such that elements in some branches of the flow of instruction execution can be ahead or behind of those at the input branch. To identify if elements were ahead or behind the instructions' submitted order, a relatively small modulo-based transaction ID is attached to transactions as they flow through the pipeline.

The modulo ID is greater than depth of the processing pipeline (thus avoiding the possibility of aliasing) where the address and data are in separate flows or branches, such that the read transactions can determine if the address elements in the other flow is ahead or behind, and stall when a write operation to the same address is in-flight ahead. Note that once the control and data are joined again for a given instruction write, the ID does not have to be used, and a simple comparison can be performed.

Figure 7:
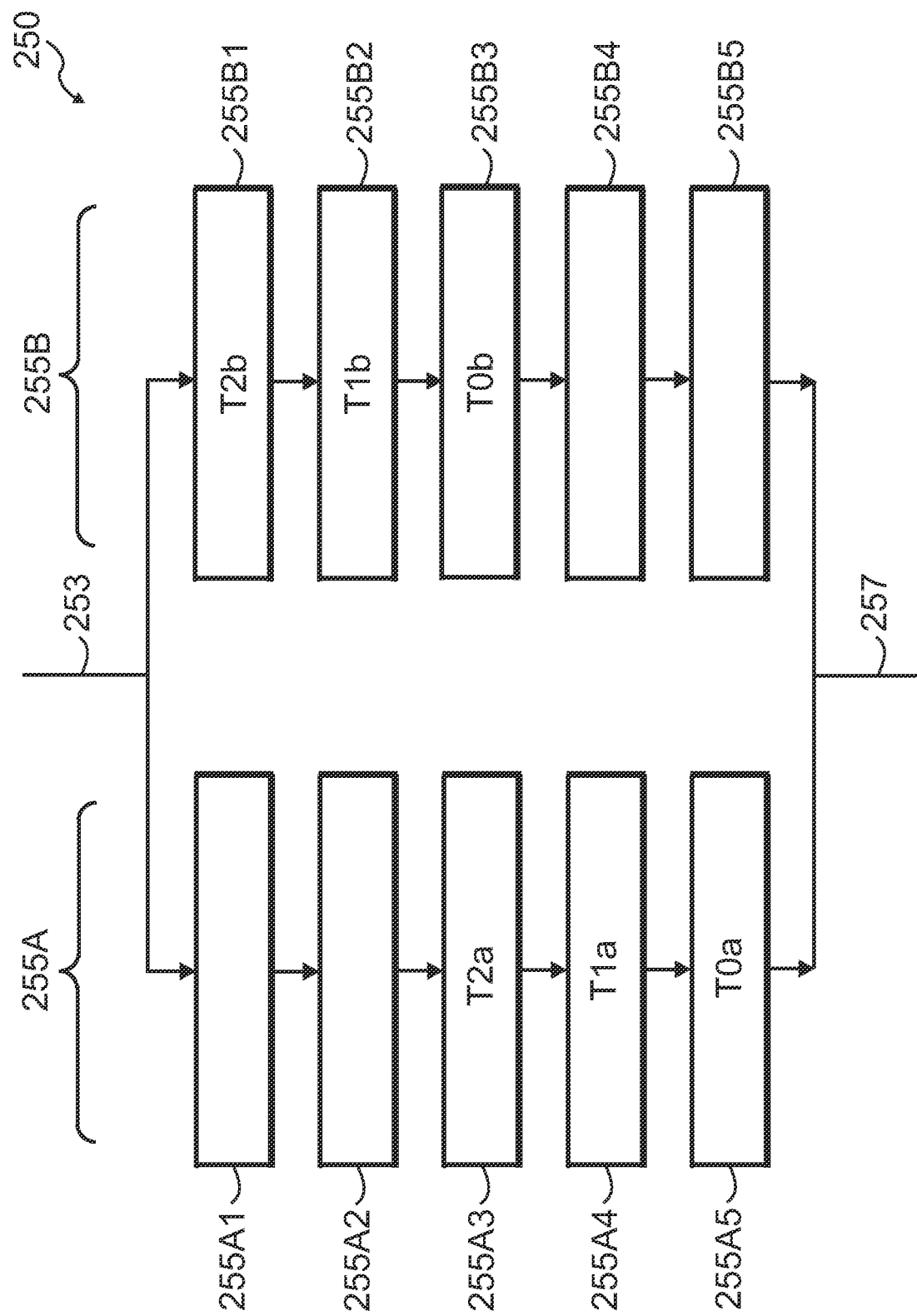
FIG. 7 shows a diagram of split pipeline processing.

FIG. 7 shows a diagram of split pipeline processing according to an exemplary embodiment. More specifically, the figure conceptualizes a split flow 250 in a pipeline in a processor according to the exemplary embodiment. Instructions can represent multiple operations, such as reads, writes, etc. The instructions can be decomposed into parts, and allowed to proceed as far as possible in their two flows (the two flows constitute control and data pipelines). The flows in such a processor may constitute control and data. The control flow represents what a given instruction is seeking to achieve. The data flow represents what the operation or instruction is to operate on (e.g., operands), and has other dependencies as there has to be datapath processing units available as well as the data, which might have to be fetched from external memory. In general, the datapath has chances of getting stalled as it can take time to fetch the elements from memory. Depending on the construction of a machine, it might not be possible for an instruction to be issued every cycle (e.g., change in control flow (branching) might take multiple cycles). Therefore, there is an advantage for the control flow to keep going when it can in order to hide these bubbles while the datapath might be introducing its own stalls.

The two flows may also rejoin, e.g., an address moving down a control pipeline joining with data in the write data pipelines. But if both pipes are allowed to proceed as deep as they can, it is possible that the transaction order to determine if a hazard is present by a simple address comparison of the stage elements.

Referring to FIG. 7, an incoming instruction at 253 is split into flow 255A and flow 255B. Flow 255A may correspond to a read operation, and flow 255B may correspond to a write operation. Flow 255A includes stages or steps 255A1-255A5. Similarly, flow 255B includes stages or steps 255B1-255B5.

In FIG. 3, three transactions, T0, T1, and T2, are split into their respective corresponding a and b components. Thus, T0 includes components T0a and T0b, T1 includes components T1a and T1b, and T3 includes components T3a and T3b.

Assume, for example, that component a contains the write addresses, and component b contains read addresses. It is not apparent which of the a stages should be part of a hardware fence, as the position of the write addressed may shift depending on operations and external stalls. To overcome that challenge, in exemplary embodiments, comparisons made by a hardware fence use a modulo ID that is ever increasing.

Therefore, in FIG. 3, the T0b component would stall on or because of hazards involving b pipe elements that have a transaction ID (modulo ID) less than itself and also a matching address (greater IDs mean the write operations occurred after the read operations, and as such will not affect the value being read).

With respect to embodiments where FIFOs are used, note that the FIFO pipeline is finite in depth. Therefore, an ever increasing transaction ID can use a modulo counting, where the module is selected large enough such that no aliases can exist in the pipelines, to establish if a hardware fence compare's write address is ahead or behind a read address, and if a given fence comparator should be used to determine if a fence hazard stall should be applied.

Figure 8:
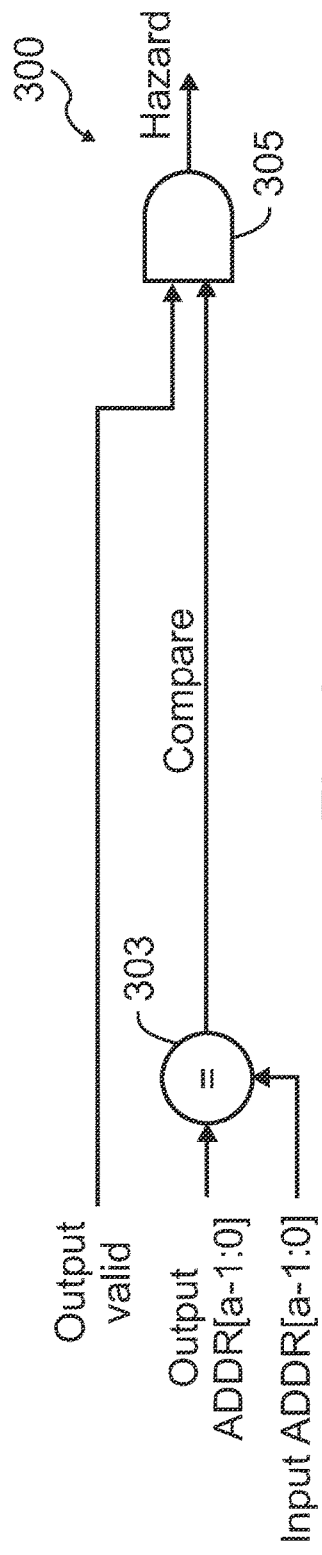
FIG. 8 shows a circuit arrangement for a hardware fence.

FIG. 8 shows a circuit arrangement 300 for a hardware fence. The hardware fence includes comparator 303 and AND gate 305. The comparator 303 compares the output address (labeled as "output ADDR[a–1:0]" where a denotes the number of address bits) with the input address (labeled as "input ADDR[a–1:0]"). The output address constitutes the address used for a write operation, and the input address constitutes the address used for a read operation.

The results of the comparison are provided as a signal (labeled "compare") to the AND gate 305. If the input address and the output address are the same, a hazard exists, and the compare signal provides a binary 1 to one input of the AND gate 305. If the "output valid" signal is also a binary 1 signal, the AND gate 305 would have a binary 1 output, i.e., a hazard exists, and the pipeline would be stalled. Although pipeline stages always exist, they might not be used. The "output valid" signal indicates that a particular pipeline stage is used and should be considered. For example, consider the initial case on the first operation of a machine. No pipeline stage should block the first operation, because all stages are idle/invalid.

Figure 9:
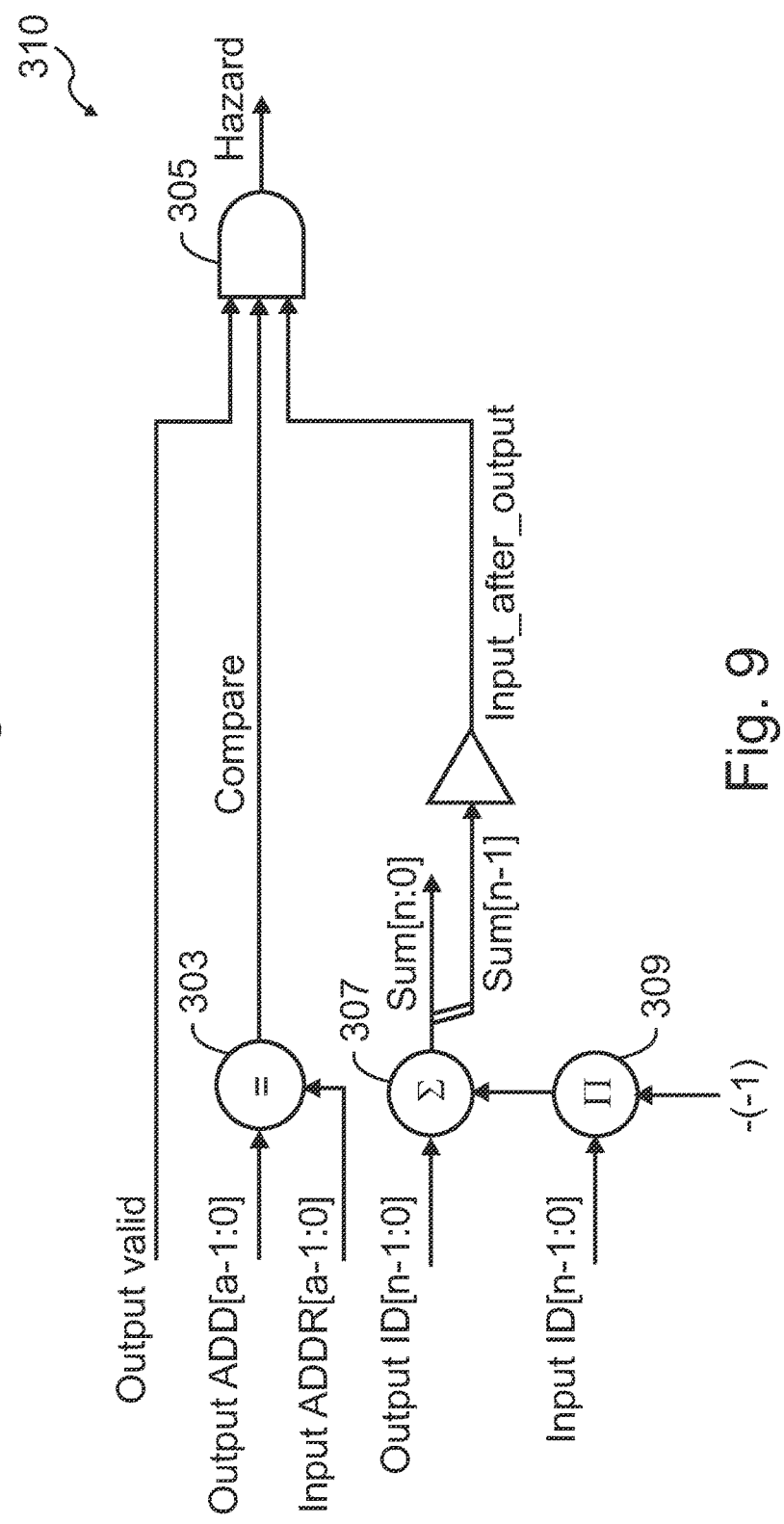
FIG. 9 shows a circuit arrangement for a hardware fence using an identification (ID) token or field.

FIG. 9 shows a circuit arrangement 310 for a hardware fence using an ID token or field, as discussed above. Similar to the embodiment in FIG. 8, the hardware fence in FIG. 9 includes comparator 303 and AND gate 305. The comparator 303 compares the output address (labeled as "output ADDR[a–1:0]" where a denotes the number of address bits) with the input address (labeled as "input ADDR[a–1:0]").

The output address constitutes the address used for a write operation, and the input address constitutes the address used for a read operation. The results of the comparison are provided as a signal (labeled "compare") to the AND gate 305.

An adder 307 and a multiplier 309 are used to implement modulo IDs, as discussed above. More specifically, the adder 307 and the multiplier 309 are used to compare the transaction IDs involved in the input and output operations (e.g., read and write). The ID of the write operation or output ID (labeled as "output ID[n–1:0]" where n denotes the number of bits in the ID) is provided to one input of the adder 307.

The ID of the read operation or input ID (labeled as "input ID[n–1:0]" is provided to one input of the multiplier 309. A negative one (–1) drives a second input of the multiplier 309. Thus, the output of the multiplier 309 is the negative of the input ID.

The adder 307 adds the output ID to the output of the multiplier 309 to generate a sum (labeled as "sum[n:0]"). A subset of the sum at the output of the adder 307, labeled as "sum[n:1]", is provided to an inverter, whose output (labeled "input_after_output") denotes whether the input (read) occurs after the output (write). In effect, sign-bit of what would be a modulo $2^n$ sum is used to determine if the input occurred after the output address or not.

If the input address and the output address are the same, the output valid signal is a binary 1, and the input_after_output is also a binary 1, a hazard exists. In this situation, the output of the AND gate 305 would have a binary 1 value, i.e., a hazard exists, and the pipeline would be stalled.

Note that in some embodiments, the multiplier 309 may be omitted, as desired. More specifically, in such embodiments, rather than using the adder 307, a subtracter may be used. In such a scenario, the ID of the write operation or output ID would drive the plus (+) input of the subtracter, and the ID of the read operation or input ID would drive the minus (–) input of the subtracter.

In some embodiments, the input block has a word-buffer, that is another data source that can go stale if the data it is buffering are in the process of being written. Because the word buffer buffers the last word read, the implementation can use the fact that the previous read could not have proceeded if it was blocked by the barrier instructions, and therefore examines the elements that could have entered the pipeline since the previous read. This scheme can reduce the cost of implementing the buffer's fence. Note that a word buffer might be considered a cache (which might use an associated partial fence, as discussed above). In other words, a word buffer constitutes a 1-word cache, for which a partial fence might suffice, as discussed above.

Figure 10:
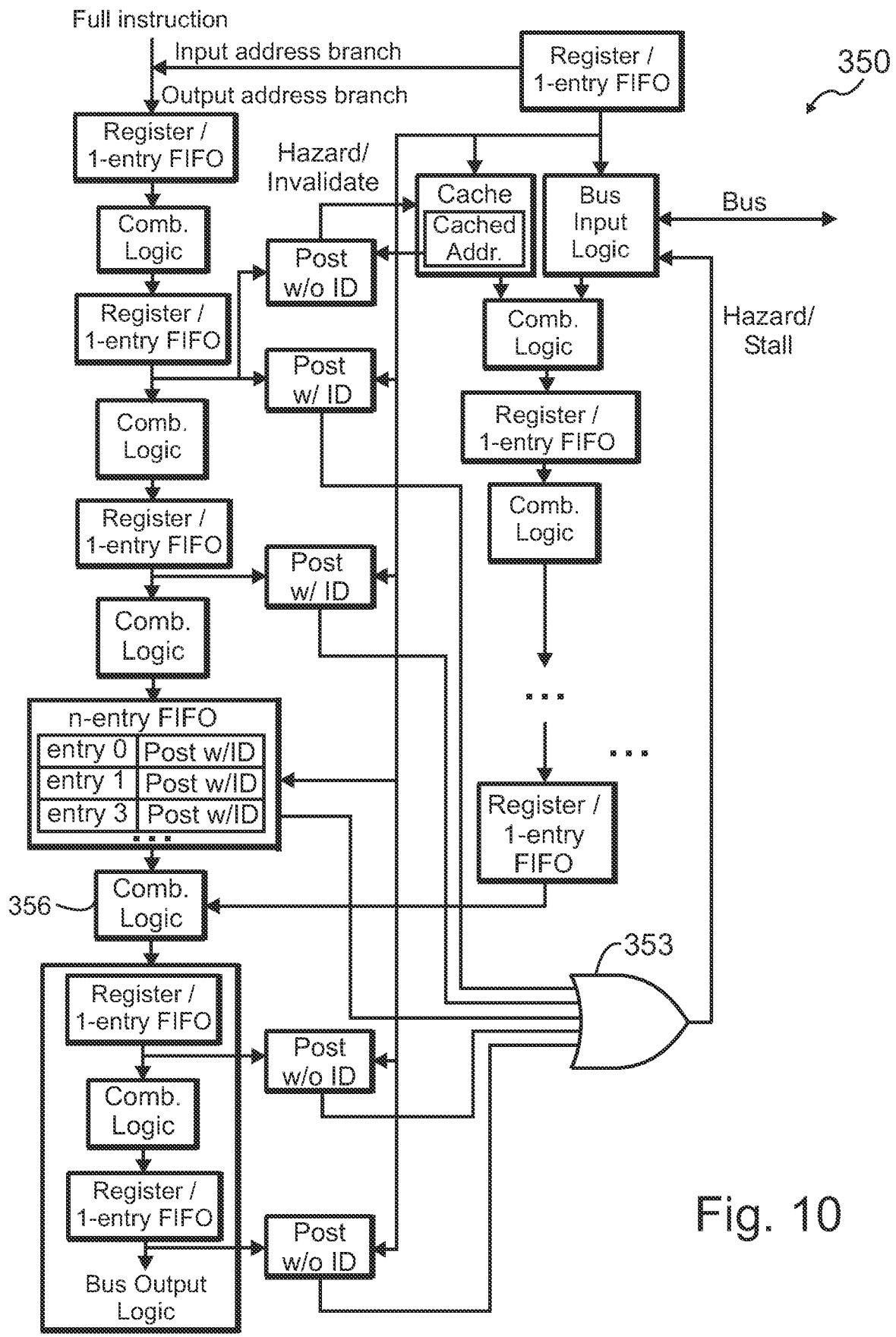
FIG. 10 shows a circuit arrangement for a pipeline processor with hardware fences.

FIG. 10 shows a circuit arrangement 350 for a pipeline processor with hardware fences. The pipeline processor in FIG. 10 embodies the various concepts and techniques for hardware fences described above (cache, FIFO, ID, etc.). This particular example shows the stream of instruction execution being split into input and output streams of execution on the same clock cycle, labeled "input address branch" and "output address branch," respectively.

The hardware fences are labeled "Post w/ ID" for fences that use the ID scheme described above, and "Post w/o ID"

for fences that do not employ the ID scheme. The hardware fences with ID is used in the section of the pipeline where the input address can be from a transaction before or after the output address. After the streams of execution are merged by the combinatorial logic circuit 356, the order of operations is known, and the ID need not be checked. Thus, after the merger of the streams of execution by the combinatorial logic circuit 356, the hardware fences without ID are used.

The outputs of the various hardware fences drive the inputs of OR gate 353. Thus, if any of the hardware fences indicates a hazard that should result in a pipeline stall, the output of the OR gate 353 would have a binary 1 value, which is used by the Bus Input Logic block to cause a stall, as described above.

Figure 11:
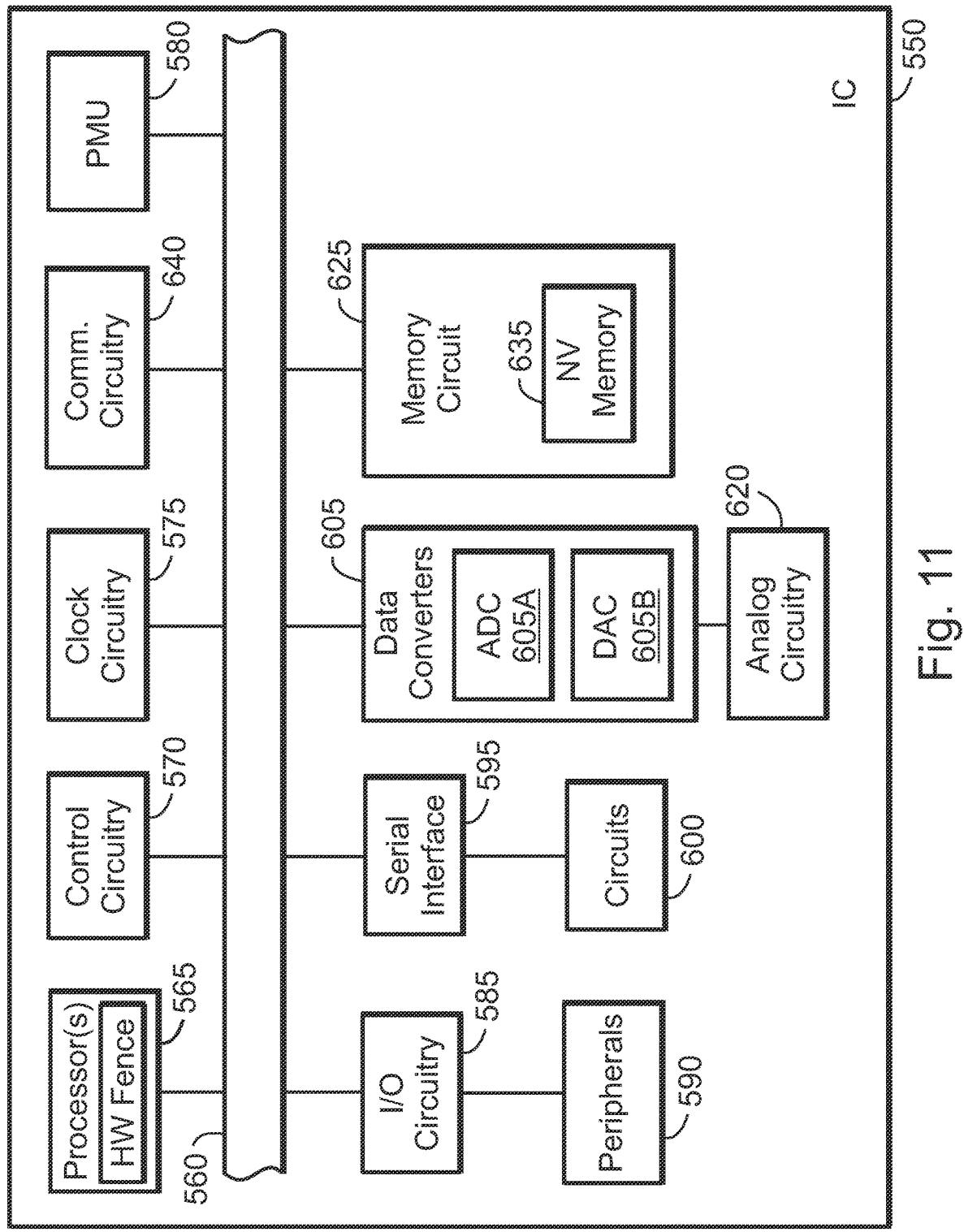
FIG. 11 shows a circuit arrangement for an IC, including processing circuitry.

Processors employing hardware fences according to exemplary embodiments may be used in a variety of circuits, blocks, subsystems, and/or systems. For example, in some embodiments, such processors may be integrated in an IC, such as an MCU. FIG. 11 shows a circuit arrangement for such an exemplary embodiment.

The circuit arrangement includes an IC 550, which constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

In exemplary embodiments, processor(s) 565 may include one or more hardware fences, as described above. The processor(s) 565 may also include cache, FIFOs, etc., to operate with the hardware fences, as desired, and as described above.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as processor(s) 565, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to processor(s) 565.

Figure 12:
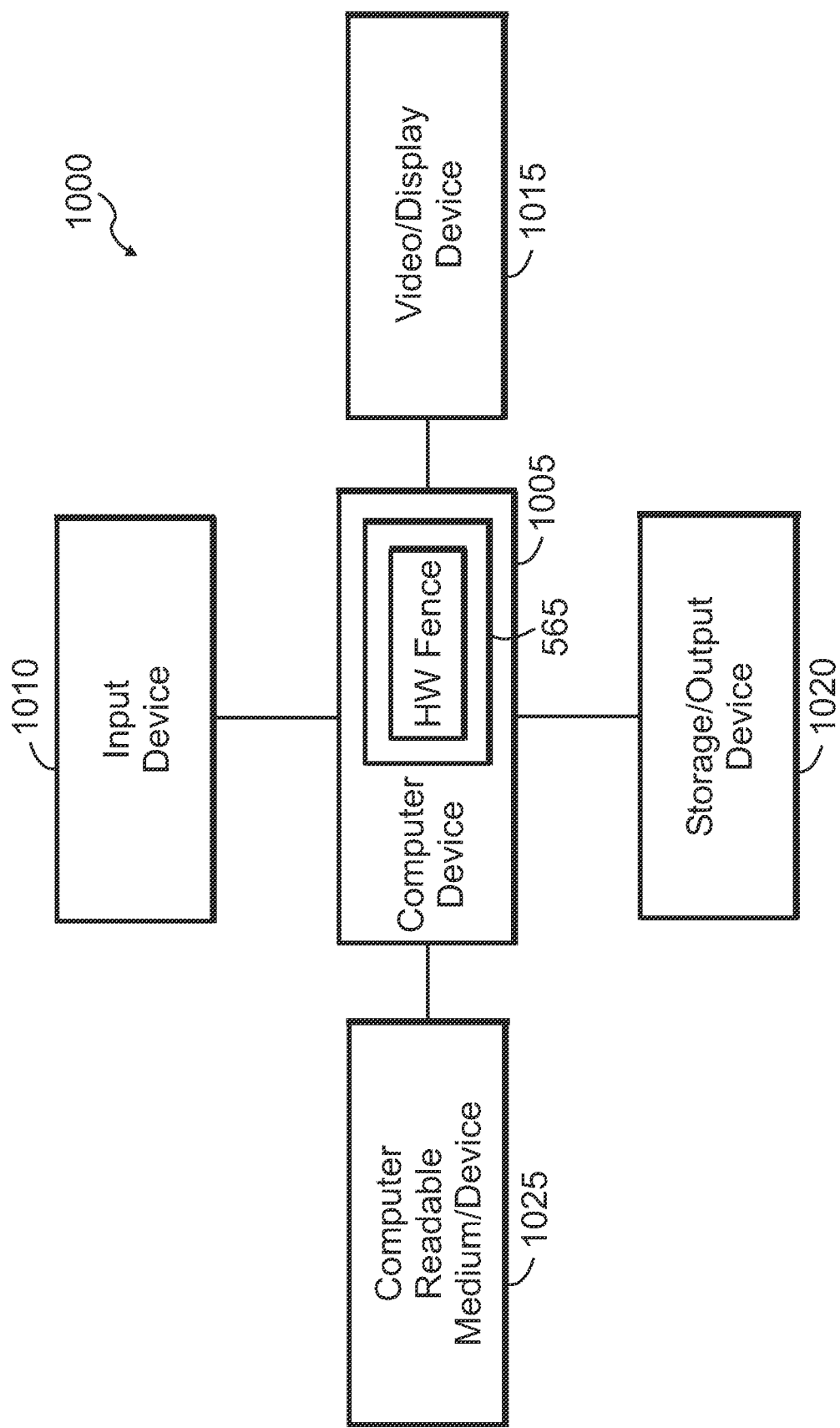
FIG. 12 shows a block diagram of a system for information processing.

According to one aspect of the disclosure, one may use processors including hardware fences according to exemplary embodiments in computer systems, devices, processors, controllers, etc. FIG. 12 shows a block diagram of an exemplary system 1000 for processing information that may be used in exemplary embodiments. System 1000, or modifications or variations of it as persons of ordinary skill in the art will understand, may be used to run or perform processes used in the disclosed concepts, for instance, as used in exemplary embodiments.

System 1000 includes a computer device 1005, an input device 1010, a video/display device 1015, and a storage/output device 1020, although one may include more than one of each of those devices, as desired. Computer device 1005 couples to input device 1010, video/display device 1015, and storage/output device 1020. System 1000 may include more than one computer device 1005, for example, a set of associated computer devices or systems, as desired.

Typically, system 1000 operates in association with input from a user. The user input typically causes system 1000 to perform specific desired information-processing tasks. System 1000 in part uses computer device 1005 to perform those tasks. Computer device 1005 includes information-processing circuitry, such as a central-processing unit (CPU), controller, microcontroller unit (MCU), etc., although one may use more than one such device or information-processing circuitry, as persons skilled in the art would understand. In exemplary embodiments, computer device 1005 includes one or more processor(s) 565. Processor(s) 565 may include one or more hardware fences, as described above. The processor(s) 565 may also include cache, FIFOs, etc., to operate with the hardware fences, as desired, and as described above.

Input device 1010 receives input from the user and makes that input available to computer device 1005 for processing. The user input may include data, instructions, or both, as desired. Input device 1010 may constitute an alphanumeric input device (e.g., a keyboard or keypad), a pointing device (e.g., a mouse, roller-ball, light pen, touch-sensitive apparatus, for example, a touch-sensitive display, or tablet), or both. The user operates the alphanumeric keyboard or keypad to provide text, such as ASCII characters, to computer device 1005. Similarly, the user operates the pointing device to provide cursor position or control information to computer device 1005.

Video/display device 1015 displays visual images to the user. Video/display device 1015 may include graphics circuitry, such as graphics processors, as desired. The visual images may include information about the operation of computer device 1005, such as graphs, pictures, images, and text. Video/display device 1015 may include a computer monitor or display, an electronic display (e.g., a liquid crystal display), a projection device, and the like, as persons of ordinary skill in the art would understand. If system 1000 uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may include a magnetic, optical, semiconductor, or magneto-optical drive capable of storing information on a desired medium and in a desired format. As another example, storage/output device 1020 may constitute a printer, plotter, or other output device to generate printed or plotted expressions of the information from computer device 1005. In some embodiments, in addition or as an alternative to storing information, storage device 1020 may provide information (e.g., previously stored information) to one or more components or parts of system 1000, for example, computer device 1005.

Computer-readable medium 1025 (or computer program product) interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures, databases, and/or file systems). When stored, encoded, recorded, and/or embodied by computer-readable medium 1025, the functional descriptive material imparts functionality. The functional descriptive material interrelates to computer-readable medium 1025. In some embodiments, computer-readable medium 1025 is non-transitory, as desired.

Information structures within the functional descriptive material define structural and functional interrelations between the information structures and computer-readable medium 1025 and/or other aspects of system 1000. These interrelations permit the realization of the information structures' functionality.

Moreover, within such functional descriptive material, computer programs define structural and functional interrelations between the computer programs and computer-readable medium 1025 and other aspects of system 1000. These interrelations permit the realization of the computer programs' functionality. Thus, in a general sense, computer-readable medium 1025 includes information, such as instructions, that when executed by computer device 1005, cause computer device 1005 (system 1000, generally) to provide the functionality prescribed by a process, computer program, software, firmware, method, algorithm, etc., as included (partially or entirely) in computer-readable medium 1025.

By way of illustration, computer device 1005 reads, accesses, or copies functional descriptive material into a computer memory (not shown explicitly in the figure) of computer device 1005 (or a separate block or memory circuit coupled to computer device 1005, as desired). Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional or desired tasks or operations.

Note that one may implement computer-readable medium 1025 in a variety of ways, as persons of ordinary skill in the art would understand. For example, memory within computer device 1005 (and/or external to computer device 1005) may constitute a computer-readable medium 1025, as desired.

Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired. In addition, input(s) and/or output(s) of system 1000 may be received from, or provided to, one or more networks (not shown), as desired.

Various circuits and blocks described above and used in exemplary embodiments may be implemented in a variety of ways and using a variety of circuit elements or blocks. For example, comparators, adders, subtracters, FIFOs, caches, etc., discussed above, may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a pipelined processor comprising branched parallel processing paths for instructions, and a hardware fence that maintains increasing transaction identifications (IDs) representing a submitted order on when instructions enter and are being processed within the branched parallel processing paths, wherein the increasing transaction IDs representing the submitted order are checked at a pipeline element level to stall a pipeline element when advancement of a pipeline stage of the branched parallel processing paths would produce an erroneous result.

2. The apparatus according to claim 1, wherein the increasing transaction IDs can be used to determine when a transaction for a stage representing part of an instruction results in a hazard by comparing an address for an input operation with an address for an output operation, wherein the input operation comprises a read operation.

3. The apparatus according to claim 2, wherein a hazard condition exists where a later read operation has an address specified that matches an address specified for an earlier write operation.

4. The apparatus according to claim 2, wherein the output operation comprises a write operation.

5. The apparatus according to claim 4, wherein the hardware fence comprises a comparator to compare the address specified for the read operation with the address specified for the write operation based on a pipeline memory element.

6. The apparatus according to claim 1, wherein the pipelined processor comprises a first-in first-out (FIFO) circuit, and wherein the hardware fence detects if a hazard condition exists by comparing an address for an input operation with an address for an output operation, wherein the input and output operations are stored in the FIFO circuit.

7. The apparatus according to claim 1, wherein the pipelined processor is stalled if the hardware fence detects that a hazard condition exists.

8. The apparatus according to claim 1, wherein the hardware fence uses modulo IDs to implement the increasing transaction IDs.

9. The apparatus according to claim 1, wherein the pipelined processor comprises a cache, and wherein a partial hardware fence is used with the cache.

10. An apparatus, comprising:
    a pipelined processor integrated into an integrated circuit, the pipelined processor comprising:
        branched parallel processing paths for instructions supplied to the pipeline processor; and
        a hardware fence that maintains increasing transaction identifications (IDs) representing a submitted order on when instructions supplied to the pipeline processor enter and are being processed within the branched parallel processing paths,
        wherein the increasing transaction IDs are checked at a pipeline element level to stall a pipeline element when advancement of a pipeline stage of the branched parallel processing paths would produce an erroneous result.

11. The apparatus according to claim 10, wherein the pipelined processor is stalled if the hardware fence detects that a hazard condition exists.

12. The apparatus according to claim 10, wherein the hardware fence uses modulo IDs to implement the increasing transaction IDs.

13. The apparatus according to claim 12, wherein the hardware fence comprises an adder or a subtracter to receive modulo IDs and to generate an output whether a first instruction occurs before a second instruction.

14. The apparatus according to claim 10, wherein the pipelined processor comprises a first-in first-out (FIFO) circuit, and wherein the hardware fence detects if a hazard condition exists by comparing an address for a read operation with an address for a write operation, wherein the read and write operations are stored in the FIFO circuit.

15. A method of processing information in a pipelined processor comprising branched parallel processing paths for instructions, and a hardware fence that maintains increasing transaction identifications (IDs) representing a submitted order on when instructions enter and are being processed within the branched parallel processing paths, the method comprising checking the increasing transaction IDs at a pipeline element level to stall a pipeline element when advancement of a pipeline stage of the branched parallel processing paths would produce an erroneous result.

16. The method according to claim 15, wherein the increasing transaction IDs can be used to determine when a transaction for a stage representing part of an instruction results in a hazard by comparing an address for an input operation with an address for an output operation, wherein the input operation comprises a read operation, and wherein the output operation comprises a write operation.

17. The method according to claim 16, wherein determining a hazard condition further comprises determining whether a later read operation has an address specified that matches an address specified for an earlier write operation.

18. The method according to claim 15, wherein the pipelined processor comprises a first-in first-out (FIFO) circuit, and wherein determining a hazard condition further comprises comparing an address for an input operation with an address for an output operation stored in the FIFO circuit.

19. The method according to claim 15, wherein increasing transaction IDs are modulo IDs.

20. The method according to claim 15, further comprising stalling the pipeline processor in response to the hardware fence detecting that a hazard condition exists.

* * * * *